United States Patent [19]

Schmidl

[11] 3,940,306

[45] Feb. 24, 1976

[54] LABEL MAGAZINE FOR LABELING MACHINES

[75] Inventor: Hans Schmidl, Dortmund-Aplerbeck, Germany

[73] Assignee: Hermann Kronseder, Worth (Danube), Germany

[22] Filed: June 13, 1974

[21] Appl. No.: 479,013

[30] Foreign Application Priority Data

June 26, 1973 Germany .......................... 2332848

[52] U.S. Cl. .................. 156/570; 193/32; 271/145

[51] Int. Cl.².. B65C 9/08; B65G 11/20; B65H 1/00

[58] Field of Search .......... 156/564, 565, 566, 567, 156/568, 569, 570, 571, 572, 573; 271/165, 166, 149, 145; 193/32, 40; 221/259

[56] References Cited

UNITED STATES PATENTS

| | | | |
|---|---|---|---|
| 1,395,232 | 10/1921 | Kronquest | 271/165 |
| 2,326,504 | 8/1943 | Smith | 193/32 |
| 3,598,399 | 8/1971 | Cottrell | 271/149 |

*Primary Examiner*—Douglas J. Drummond
*Attorney, Agent, or Firm*—Joseph P. House, Jr.

[57] ABSTRACT

A label magazine having a bend is provided with ratchet teeth formed on the outside wall of the bend to cause fanning of the labels as they negotiate the bend and thus facilitate movement of the labels around the bend without jamming therein.

5 Claims, 2 Drawing Figures

LABEL MAGAZINE FOR LABELING MACHINES

BACKGROUND OF THE INVENTION

Label magazines having intermediate bends are shown in German Pat. No. 1,238,384 of Oct. 19, 1967. See also German Pat. No. 264,330 of Sept. 20, 1913. Label magazines with intermediate bends are subject to labels jamming in the bend because of the necessity for the labels to traverse the bend and to change their plane of orientation during such traverse. The tendency of the labels to stick together inhibits their ability to reorient themselves as they move around the bend.

SUMMARY OF THE INVENTION

In accordance with the present invention, the bend in such a label magazine is provided with ratchet teeth formed on the outside wall of the bend, thus to cause fanning of the labels as they negotiate the bend and thus relieve the tendency of such labels to jam. The fanning action causes one label to slip slightly with respect to the next label, thus relieving friction and other internal stresses developed in the label pack. This loosens up the pack, facilitates reorientation of the labels and makes it easier for the labels to negotiate the bend.

Other objects, features and advantages of the invention will appear from the disclosure hereof.

DESCRIPTION OF THE PREFERRED EMBODIMENT

Figure 1:
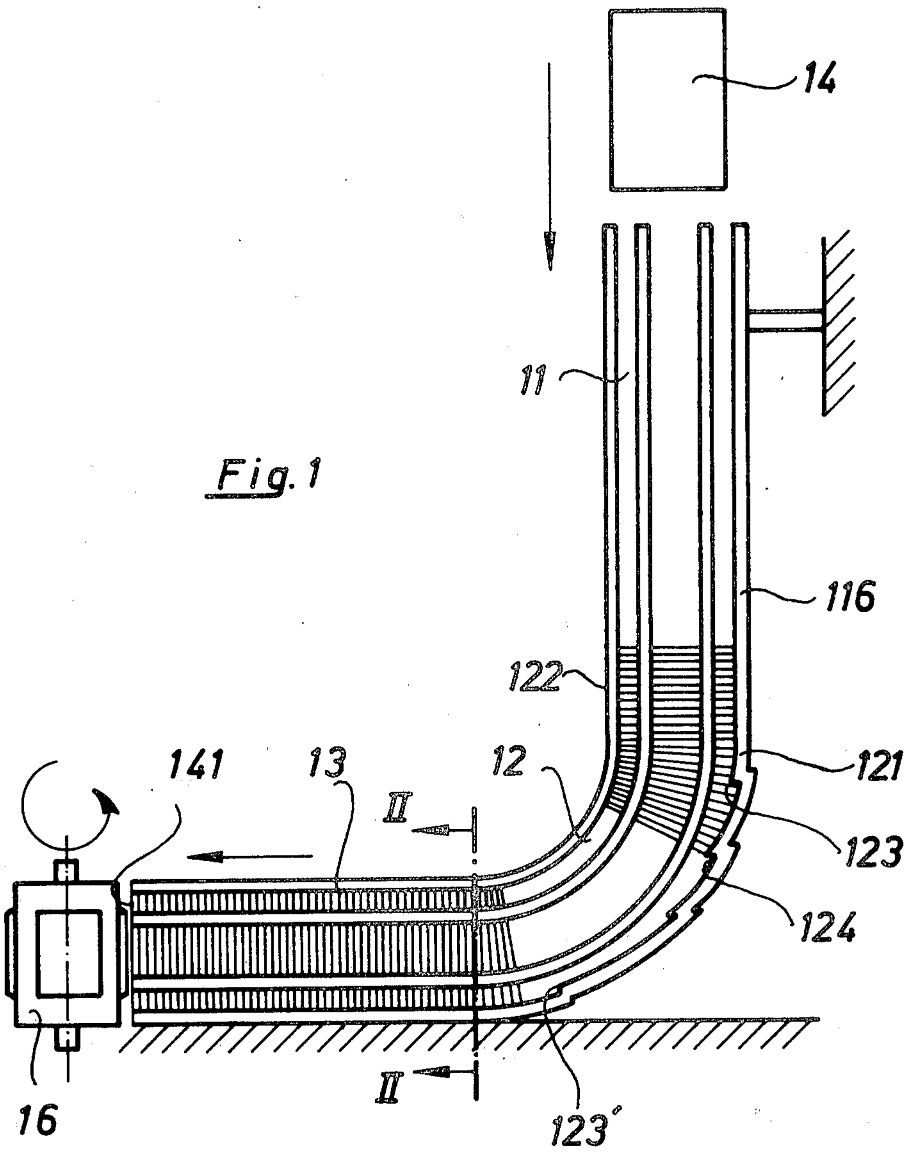
FIG. 1 is a side view illustrating a label magazine embodying the present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The illustrated label magazine comprises a vertically oriented infeed portion 11 and a horizontally oriented outfeed portion 13. These portions are connected on the bend 12. A pack 14 of stacked labels is inserted into the label magazine in the direction of the arrow and is fed by gravity or by a pressure platen or the like through the label magazine and to the label extraction drum 16.

Figure 2:
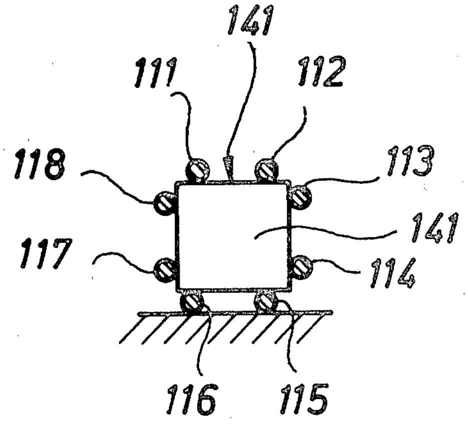
FIG. 2 is a vertical cross section taken along the line II—II of FIG. 1.

In the illustrated embodiment, the label magazine is made up of a series of bars or rods formed into a skeleton like frame. As best shown in FIG. 2, there are two top bars 111, 112, two right side bars 113, 114, two bottom bars 115, 116, and two left side bars 117, 118. The top bars 111, 112 form the inside corner wall 122 of the bend 12 and the two bottom bars 115, 116 form the outside corner wall 121 of the bend 12.

In accordance with the present invention, the outside corner wall formed by bars 115, 116 is provided with ratchet teeth 123, 123'. These teeth are so formed as to gradually constrict or decrease the cross section of the magazine on the upstream side of a tooth 123 and then to abruptly enlarge or increase the cross section of the magazine on the downstream side of a tooth 123.

Accordingly, as labels 141 are fed through the magazine they will encounter the ratcheted outside wall 121 of the bend. The ratchets will cause mutual sliding of one label with respect to another and gradual fanning of the labels in the stack as each tooth 123 is approached from its upstream side. As the labels pass over each tooth the labels will be subject to an abrupt snapping or reverse fanning action as they pass over the downstream side 124 of the ratchet teeth.

This fanning action relieves stresses caused by friction, sticking and other forces tending to bind the stacked labels together and reduces the tendency of the labels to jam in the bend 12. The fanning action loosens up the stack and frees the labels to change their plane of orientation from horizontal to vertical as they move around the bend. The fanning action has the incidental advantage that it will loosen up the labels in the stack for easier release from the stack to the extraction drum 16.

As illustrated in FIG. 1, the ratchet teeth are primarily located in that portion of the bend 12 which is adjacent the vertical infeed portion 11 of the magazine. Three teeth 123 are located in this part of the bend. However, it is also useful to have at least one ratchet tooth 123' adjacent the horizontal outfeed portion 13 of the magazine.

The successive ratchet teeth 123, 123' insure the proper change in attitude of the individual labels 141 so that they remain substantially perpendicular to the side walls of the magazine throughout the curve of the bend and without jamming therein.

I claim:

1. In a label magazine having a bend formed by inside and outside magazine walls between which a pack of stacked labels is confined, the improvement for assisting packed labels located in the bend to negotiate the bend and comprising ratchet teeth formed on said outside wall of the bend to successively narrow and widen the space between said walls and cause fanning of the labels in the pack as they negotiate the bend.

2. The improvement of claim 1 in which the label magazine has a vertical infeed portion and a horizontal outfeed portion, said portions being connected on said bend.

3. The improvement of claim 2 in which said ratchet teeth are primarily in that portion of the bend adjacent said infeed portion.

4. The improvement of claim 3 in which a ratchet tooth is adjacent said outfeed portion.

5. The improvement of claim 1 in which said label magazine comprises rods curved to form said bend, said ratchet teeth being formed in rods which form the outside wall of said bend.

* * * * *